July 4, 1950  N. A. NILSSON  2,513,889
DEVICE IN EASELS FOR LOCKING THE PARTS OF THE
DISPLACEABLE LEGS TO ONE ANOTHER
Filed Dec. 13, 1945
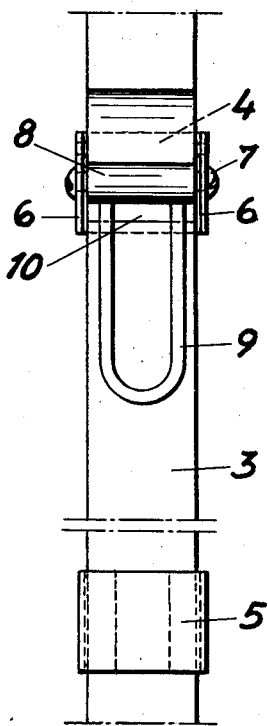
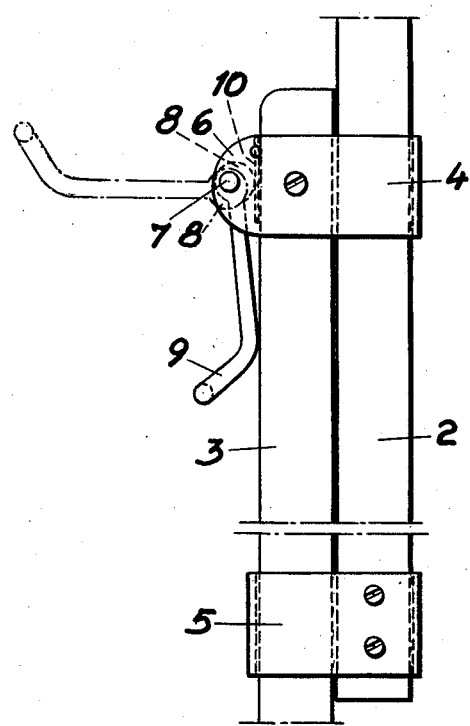
INVENTOR
NILS ADRIAN NILSSON Patented July 4, 1950

2,513,889

UNITED STATES PATENT OFFICE 2,513,889

DEVICE IN EASELS FOR LOCKING THE PARTS OF THE DISPLACEABLE LEGS TO ONE ANOTHER

Nils Adrian Nilsson, Stockholm, Sweden, assignor to Aktiebolaget Wilh. Becker, Stockholm, Sweden Application December 13, 1945, Serial No. 634,711
In Sweden July 2, 1945

1 Claim. (Cl. 248—195)

The present invention relates to a device in easels for locking the parts of the displaceable legs to one another. Known devices of this kind have consisted of sleeves surrounding two leg parts and provided with a winged nut bolt which extended through one leg part and, when turned, was pressed with its end against the other leg part or was detached therefrom. This device was very tedious to manipulate because the nuts had to be tightened or unscrewed at each change of the length of the legs. The present invention relates to a device in which this drawback is eliminated and which is substantially characterised by a sleeve surrounding two leg parts, one of which is rigidly conneced with the sleeve and the other is slidable in the sleeve, and by an eccentric, the pivot of which is carried by the sleeve, the said eccentric being so arranged that in one position it presses the leg parts towards one another and towards the rear wall of the sleeve so that the leg parts are locked but in another position allows of the displacement of the parts relatively to one another. That side of the sleeve which faces the eccentric, can consist of a resilient wall.

An embodiment of the device according to the invention is illustrated on the accompanying drawing, in which: Fig. 1 is a front view and Fig. 2 is a side view of the device.

The reference numerals 2 and 3 designate two leg parts which are displaceable in sleeves 4 and 5, the sleeve 4 being fixed to the leg part 3 and the other sleeve 5 to the leg part 2. Flaps 6 project from two sides of the upper sleeve 4, said sides resting against the two leg parts. A shaft 7 of an eccentric 8 is turnably mounted in the said flaps. The eccentric is adapted to be actuated by a clamp 9. That side 10 of the sleeve 4 which faces the eccentric, is swingably fixed to the side walls of the sleeve so that it can be pressed by the eccentric against the leg part 3 when the leg parts are to be locked to one another.

The invention is not restricted to the shown embodiment but the details can be varied in many ways without going beyond the scope of the invention. The clamp 9 can have any shape. The eccentric may actuate the leg part directly. The side 10 of the sleeve can be fixed to the sleeve in any suitable way.

Having now described my invention, what I claim as new and desire to secure by Letters Patent is:

A device in easels for locking the displaceable leg parts to one another, characterised by a sleeve surrounding two leg parts, one of which is rigidly connected with the sleeve and the other is slidable in the sleeve, and by an eccentric, the pivot of which is carried by the sleeve, that side of the sleeve facing the eccentric consisting of a swingable resilient wall, said wall being pivoted to said sleeve, the said eccentric being so arranged that in one position it presses the leg parts towards one another and towards the rear wall of the sleeve so that the leg parts are locked but in another position allows of the displacement of the parts relatively to one another.

NILS ADRIAN NILSSON.

REFERENCES CITED

The following references are of record in the file of this patent:

UNITED STATES PATENTS

| Number | Name | Date |
|---|---|---|
| 58,535 | Armington | Oct. 2, 1866 |
| 463,471 | Bartlett | Nov. 17, 1891 |
| 650,636 | Cunningham et al. | May 29, 1900 |

FOREIGN PATENTS

| Number | Country | Date |
|---|---|---|
| 12,332 | Great Britain | 1914 |